Jan. 18, 1944.   E. T. CARLSON ET AL   2,339,600
BUS DUCT SYSTEM
Filed April 3, 1940   2 Sheets-Sheet 1
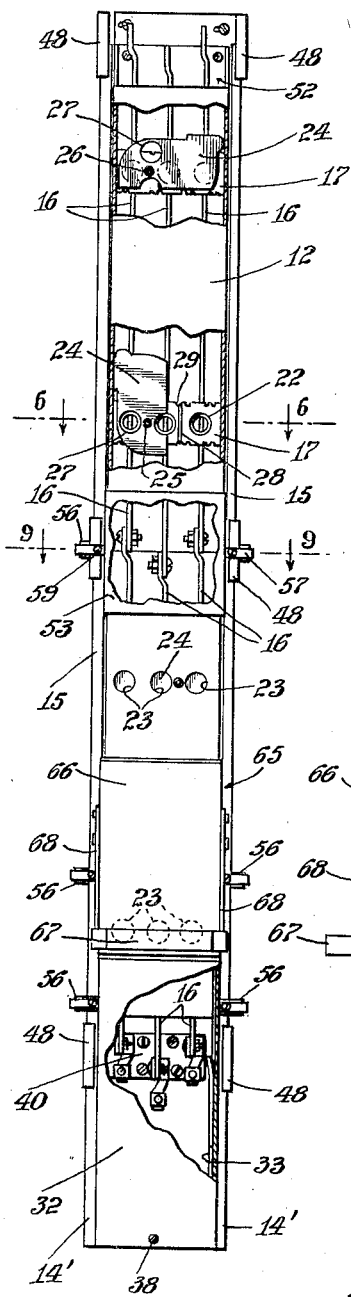
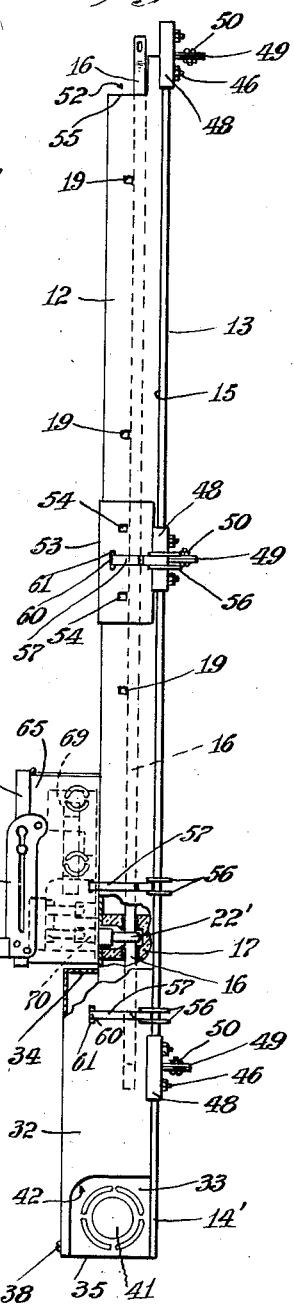
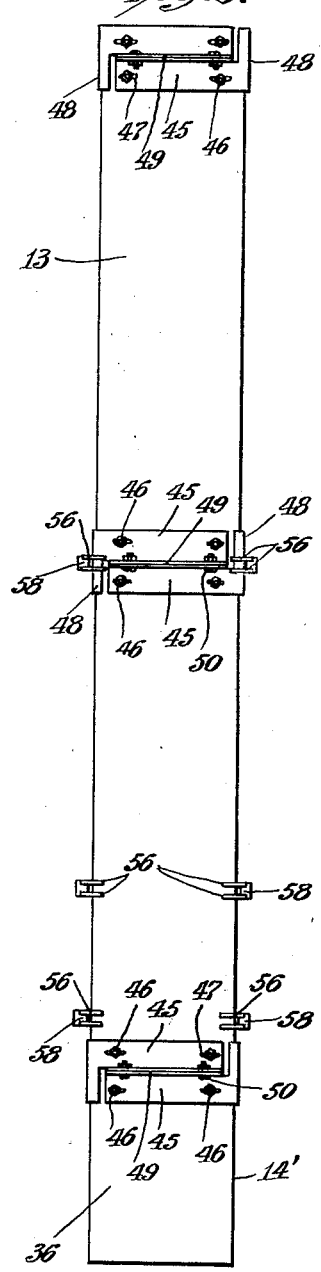
INVENTOR
Elmer T. Carlson
William C. Anderson
BY
ATTORNEY Jan. 18, 1944.   E. T. CARLSON ET AL   2,339,600
BUS DUCT SYSTEM
Filed April 3, 1940   2 Sheets-Sheet 2
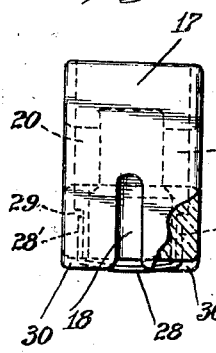
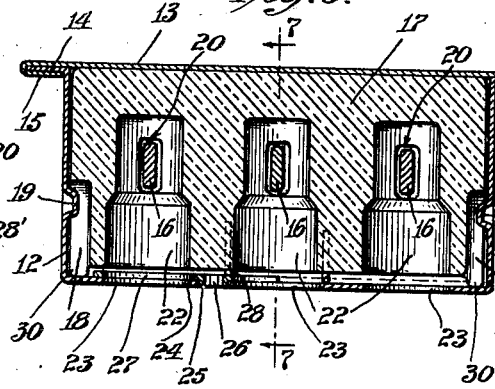
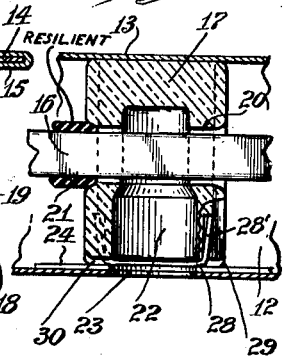
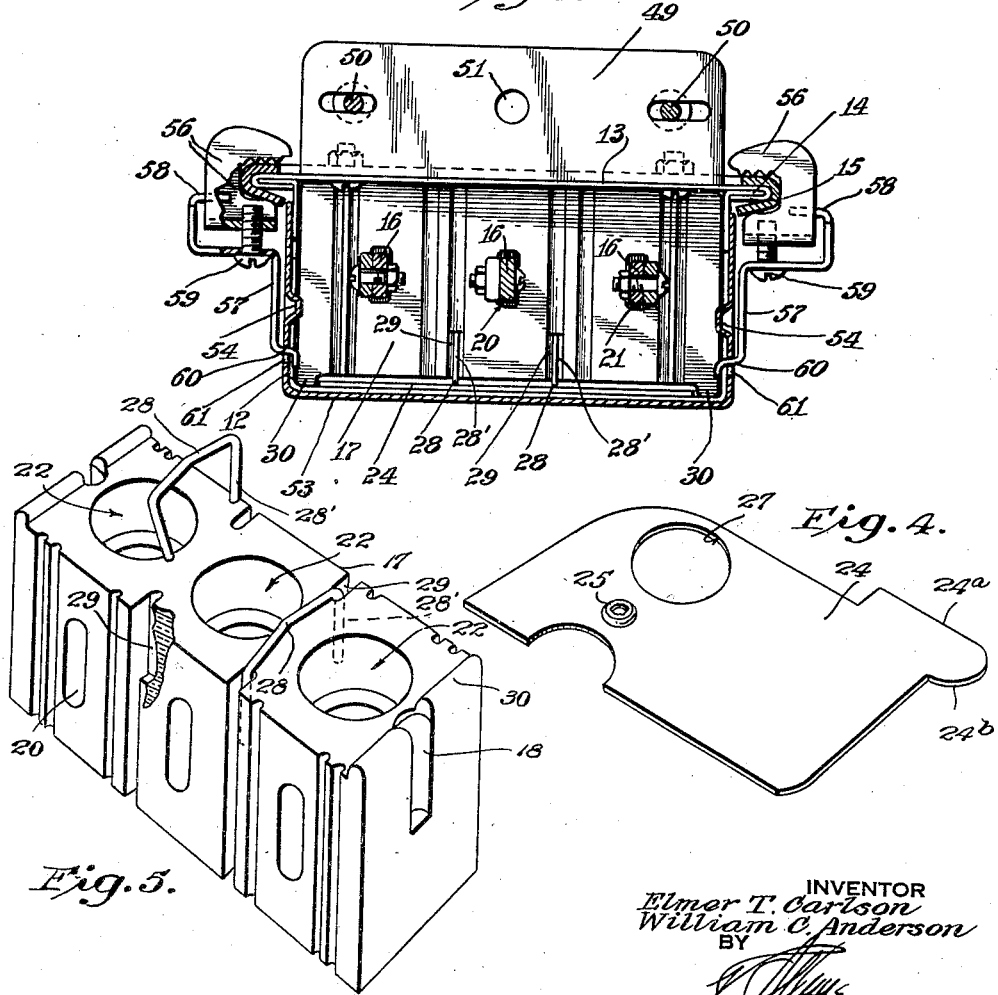
INVENTOR
Elmer T. Carlson
William C. Anderson
BY
ATTORNEY Patented Jan. 18, 1944

2,339,600

UNITED STATES PATENT OFFICE 2,339,600

BUS DUCT SYSTEM

Elmer T. Carlson, Fort Mitchell, and William C. Anderson, Bromley, Ky., assignors to The Trumbull Electric Manufacturing Company, Plainville, Conn., a corporation of Connecticut Application April 3, 1940, Serial No. 327,578

4 Claims. (Cl. 173—334.1)

Our invention relates to bus bar duct systems of power distribution. One object is to provide a simple but strong and efficient duct.

Such ducts contain bus bars and have openings through which branch circuit connector plugs may be inserted to engage the bus bars when desired.

One object is to provide a simple and satisfactory shutter for closing the openings when not in use.

Another object is to provide a shutter construction supported by the duct itself independently of the bus bars and their support.

Another object is to provide for convenient operation of the shutter.

Another object is to hold the shutter so that it will not rattle or accidentally work loose.

One object is to provide a shutter which can be relied upon to keep the openings tightly closed.

Details of the improvements will be found illustrated in the drawings and described hereinafter.

Fig. 1 is a front view of parts of a duct system embodying our invention, showing a terminal box, a branch box and a connector and hanger, parts being broken away and parts in section to show details.

Fig. 2 is a side view of the same.

Fig. 3 is a rear view of the same.

Fig. 4 is a perspective view of a shutter.

Fig. 5 is a perspective view of an insulating block for supporting bus bars in the duct and for supporting springs which hold the shutter in position.

Fig. 6 is a transverse sectional view on the plane of the line 6—6 of Fig. 1 on a larger scale.

Fig. 7 is a fragmentary longitudinal view on the plane of the line 7—7 of Fig. 6.

Fig. 8 is an edge view of one of the insulating blocks for supporting the bus bars.

Fig. 9 is a transverse sectional view on the plane of the line 9—9 of Fig. 1.

The duct itself consists of two parts, the lower part 12 being preferably of sheet metal formed into a U-shaped trough, and the upper part 13 being substantially flat. These two parts are connected together by interlock flanges. Preferably the lower part has an outwardly flaring flange 14 at each edge, and the upper part 13 has an inturned flange 15 bent around the flange 14.

The bus bars 16 are supported by an insulating block 17 in spaced relation. Each block 17 is preferably formed of insulating material and has a groove 18 in each edge adapted to register with an indented portion or projection 19 at the side of the duct portion 12. These insulating blocks 17 of course are arranged at suitable intervals throughout the length of the duct. Each insulating block 17 has passages 20 through which the bus bars extend. Soft rubber members 21 may be employed to hold the bus bars in place for instance in shipment.

Some of the insulating supporting blocks may be provided with recesses 22 open at their lower ends and communicating with the bus bars so as to permit the insertion of the contact blades 22' of distribution plugs as will be more fully disclosed hereinafter.

The lower duct member 12 is provided with openings 23 in line with the recesses 22. When a branch connector is not in place, it is desirable to close these openings 23. For this purpose we provide a shutter 24 which is pivoted to the duct by means of a collar 25 which projects into a bearing in the duct and this collar is preferably provided with a recess 26 or other suitable means for the engagement of a wrench, screw driver or other tool for actuating the same from the outside. When the shutter is in the position shown in the upper part of Fig. 1, the recesses in the insulating block are all closed. When the shutter is in the position shown in the next lower part of Fig. 1, the recesses are all open. For this purpose the shutter itself has a passage 27 which registers with the left hand opening 23 in the duct. To hold the shutter in place resiliently we provide a spring 28 of U-shape having side arms 28' which engage in grooves 29 in the sides of the insulating blocks. The central part of this spring 28 engages the shutter 24 and presses it against the duct. The block 17 is provided with flanges 30, at its opposite ends, to hold the block spaced away from the shutter as shown in Fig. 6.

The end 24a of the shutter serves as a stop by striking the adjacent wall of the duct when moving the shutter to uncover the entrances to the bus bars as shown just above the center of Fig. 1. The other end 24b of the shutter serves as a stop by striking against the adjacent wall of the duct when closing the openings as shown at the upper part of Fig. 1. The operator is thus notified when he has opened or closed the entrances to the bus bars. These stops are so constructed that there is no danger of damage to the parts when opening or closing the shutter. As the shutters are carried solely by the duct structure independently of the bus bars and insulators they can be installed independently regardless of the type of bus bars required. It will also be noted that the shutter has no projecting part and is actuated solely by means of the pivot or hub. This provides a very neat appearance and avoids accidental distortion or damage to the shutter.

The end of the duct may be closed by a terminal box consisting of two parts, 32 and 33. The part 32 has a flange 34 which engages the part 12 of the duct. The part 33 is constructed similar to the duct part 12 but is closed by an end piece 35. The plate 36 which forms one wall of the terminal box has side flanges 14' corresponding with the flanges 14. The end plate 35 has a flange 37 on which one end of the member 32 rests. A screw 38 passes through the member 32 and engages in a flange 37 to hold the parts together at this point.

Inside of the terminal box is a terminal block 40 of insulating material which is suitably secured in place and serves to support the ends of the bus bars. The sides and end of the terminal box are provided with suitable knockouts such as 41 for connection of cables, conduits, etc. It will be noted that one end of the member 32 is cut away at 42 so as to expose the knockouts on the sides of the other part of the terminal box. The end of the duct member 12 may be cut away at 43 and the end of the terminal box may be cut away at 44 to facilitate access to the bus bar terminals for wiring purposes etc. These spaces are of course closed by the side walls of the box members 32 when that is secured in place.

It will be understood of course that the duct is made up of sections of suitable length and that these sections must be secured together end to end in an installation. For the purpose of connecting adjacent ends we have provided a special connector consisting of two parts. Each part has a plate 45 which is adapted to be connected to a duct member 13 by a number of bolts 46 which pass through transverse slots 47 in the plate 45 and through the duct member 13. Each plate has a hook like flange 48 engaging one edge of the duct member 13. The transverse slots permit adjustment laterally. Each plate 45 has an outwardly projecting flange 49 and the flanges 49, 49 are drawn together by screws or bolts 50 which extend through the slots in the flanges so as to permit the transverse adjustment of the plates and attached parts.

By eliminating the bolts 46, the connector members may be used as hangers for the system at any point along an assembled run of duct. In this case the hook-like flanges 48 constitute the only means of securing these members to the duct, with the bolts 50 holding the two halves of the hanger or connector together.

The flanges 49 may be provided with perforations such as 51 to accommodate the hanger or supporting device. From this it will be seen that the connecting devices may constitute a hanger while also serving to connect duct sections. The adjacent ends of the duct sections may be provided with cut-away portions 52 to provide access to the bus bars and their connections.

A closure device 53 has flanges which overlap the sides of the duct member 12. These flanges may have indented portions 54 adapted to be positioned by edges 55 near the ends of the duct sections.

To secure the member 53 in place we provide a special form of clamping device. Each clamp has a pair of jaws 56 adapted to engage the edges 48 of the connector or the edges of the duct part 13. The jaw member 56 may be formed of sheet metal bent into U-shape. An anchorage bar 57 is connected to the clamp jaws by means of a hook-like terminal 58 and a clamp screw 59. The other end of the member 57 has a hook-like portion 60 adapted to be interlocked in slot 61 in the member 53. The assembled position of these parts will be seen in Fig. 9. To assemble the clamp it is merely necessary to insert the hook-like end 60 into the opening 61 and then slip the jaws 56 over the edge 48 and tighten the screw 59. This screw then draws the member 53 to its seat on the duct member 12.

The branch circuit distributing connections are formed by means of a distributor box, the details of which may be the subject of another application. In the form shown, the box consists of a main body portion 65 with cover 66 hinged at one end and provided with a handle 67 and lever 68 for opening the cover. The box portion has suitable branch terminals 69 and protective fuses of suitable character. The box also has stationary terminals 70 provided with extension contact blades 22' for engaging the bus bars. The cover is provided with a U-shaped switch member for closing the circuit when the cover of the box is closed. This distribution box 65 is secured to the duct by means of clamps such as heretofore described.

It will be understood that the duct is provided with a number of stations to receive distribution boxes in the usual manner.

All contact openings are effectively sealed and the sealing devices easily actuated. The contact stabs are also effectively isolated.

We claim:

1. A bus bar insulating block having passages for bus bars and recesses for contact plugs leading to said bus bars, said block having grooves in its opposite side walls and a U-shaped spring supported in said grooves.

2. A bus bar insulating block for supporting bus bars and having recesses for contact plugs leading to said bus bars, a shutter for closing said recesses and a U-shaped spring supported by opposite sides of said block and engaging said shutter.

3. A bus bar insulating block having passages for bus bars and recesses for contact plugs leading to said bus bars, said block having grooves in its side walls and a U-shaped spring supported in said grooves and a shutter engaged by said spring.

4. In a system of the character described a bus duct having three openings for the insertion of terminals to engage corresponding bus bars within the duct and a shutter pivoted inside the duct on a center between adjacent openings and in one position closing all three openings, said shutter having stop portions adapted to engage opposite adjacent walls of the duct to limit the rotation of the shutter.

ELMER T. CARLSON.
WILLIAM C. ANDERSON.